United States Patent
Kurmus et al.

(10) Patent No.: US 10,229,046 B2
(45) Date of Patent: *Mar. 12, 2019

(54) MEMORY CATEGORIZATION

(71) Applicant: INTERNATIONAL BUSINESS MACHINES CORPORATION, Armonk, NY (US)

(72) Inventors: Anil Kurmus, Zurich (CH); Matthias Neugschwandtner, Zurich (CH); Alessandro Sorniotti, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/611,570

(22) Filed: Jun. 1, 2017

(65) Prior Publication Data

US 2018/0349260 A1 Dec. 6, 2018

(51) Int. Cl.
*G06F 12/00* (2006.01)
*G06F 12/02* (2006.01)
*G06F 11/30* (2006.01)

(52) U.S. Cl.
CPC .......... *G06F 12/023* (2013.01); *G06F 11/302* (2013.01); *G06F 11/3037* (2013.01)

(58) Field of Classification Search
None
See application file for complete search history.

(56) References Cited

U.S. PATENT DOCUMENTS

| 8,621,607 | B2 | 12/2013 | Pike |
| 8,925,090 | B2 | 12/2014 | Kc et al. |
| 9,245,110 | B2 | 1/2016 | Deutschle et al. |
| 9,477,711 | B2* | 10/2016 | Goel ................ G06F 17/3053 |
| 2007/0277018 | A1* | 11/2007 | Tanaka .............. G06F 3/0605 |
| | | | 711/171 |

(Continued)

FOREIGN PATENT DOCUMENTS

EP 2966587 A1 1/2016

OTHER PUBLICATIONS

IBM, List of IBM Patents or Patent Applications Treated as Related, Appendix P, dated Dec. 27, 2017, 2 pages.

(Continued)

*Primary Examiner* — John A Lane
(74) *Attorney, Agent, or Firm* — Michael O'Keefe

(57) ABSTRACT

Separating data of trusted and untrusted data types in a memory of a computer during execution of a software program. Assigning mutually separated memory regions in the memory, namely, for each of the data types, a memory region for storing any data of the respective data type, and an additional memory region for storing any data which cannot be uniquely assigned to one of the data types. For each allocation instruction, performing a memory allocation including linking the allocation instruction to at least one data source, generating instruction-specific context information, evaluating the data source to determine the data type, associating the data type with the context information, based on the context information, assigning the allocation instruction to the memory region assigned to the evaluated data type, and allocating memory for storing data from the data source in the assigned memory region.

14 Claims, 4 Drawing Sheets

(56) References Cited

U.S. PATENT DOCUMENTS

| | | | |
|---|---|---|---|
| 2009/0019425 A1* | 1/2009 | Archambault | G06F 8/4442 717/120 |
| 2014/0020112 A1 | 1/2014 | Goodes | |
| 2014/0047538 A1 | 2/2014 | Scott et al. | |
| 2016/0063247 A1 | 3/2016 | Farjon et al. | |
| 2016/0078518 A1* | 3/2016 | Sundaresan | G06F 17/30867 705/26.62 |
| 2016/0259682 A1* | 9/2016 | Stark | G06F 11/1064 |
| 2017/0033930 A1 | 2/2017 | Costa et al. | |
| 2018/0074729 A1* | 3/2018 | Feng | G06F 3/0619 |

OTHER PUBLICATIONS

Pending U.S. Appl. No. 15/840,118, filed Dec. 13, 2017, entitled: "Memory Categorization", 37 pages.

Snow et al., "Just-In-Time Code Reuse: On the Effectiveness of Fine-Grained Address Space Layout Randomization", 2013 IEEE Symposium on Security and Privacy, pp. 574-588.

Wang et al., "deExploit: Identifying misuses of input data to diagnose memory-corruption exploits at the binary level", Journal of Systems and Software, vol. 124, Feb. 2017, pp. 153-168.

Mothe et al., "DPTRACE Dual Purpose Trace for Exploitability Analysis of Program Crashes", v1.1, http://github.com/rrbranco/BlackHat2016, pp. 1-28.

Abadi et al., "Control-Flow Integrity", Principles, Implementaions, and Applications, CCS'05, Nov. 7-11, 2005, Alexandria, Virginia, USA., Copyright 2005 ACM 1-59593-226-7/05/0011, pp. 1-14.

Bosman et al., "Minemu: The World's Fastest Taint Tracker", Version 2.0, 2010 http://www.sans.org/top25-software-errors/, pp. 1-20.

Lee et al., "Preventing Use-after-free with Dangling Pointers Nullification", NDSS '15, Feb. 8-11, 2015,Copyright 2015 Internet Society, ISBN 1-891562-38-X, http://dx.doi.org/10.14722/ndss.2015.23238, pp. 1-15.

Akritidis et al., "Preventing Memory Error Exploits with WIT", 2008 IEEE Symposium on Security and Privacy, pp. 1-15.

Akritidis, "Cling: A Memory Allocator to Mitigate Dangling Pointers", USENIX Security Symposium 2010, https://www.semanticscholar.org/paper/Cling-A-Memory-Allocator-to-M . . . ,pp. 1-2.

Novak et al, "DieHarder: Securing the Heap", CCS'10, Oct. 4-8, 2010, pp. 1-12.

Castro, "Securing software by enforcing data-flow integrity", OSDI '06: 7th USENIX Symposium on Operating Systems Design and Implementation, pp. 147-160.

* cited by examiner

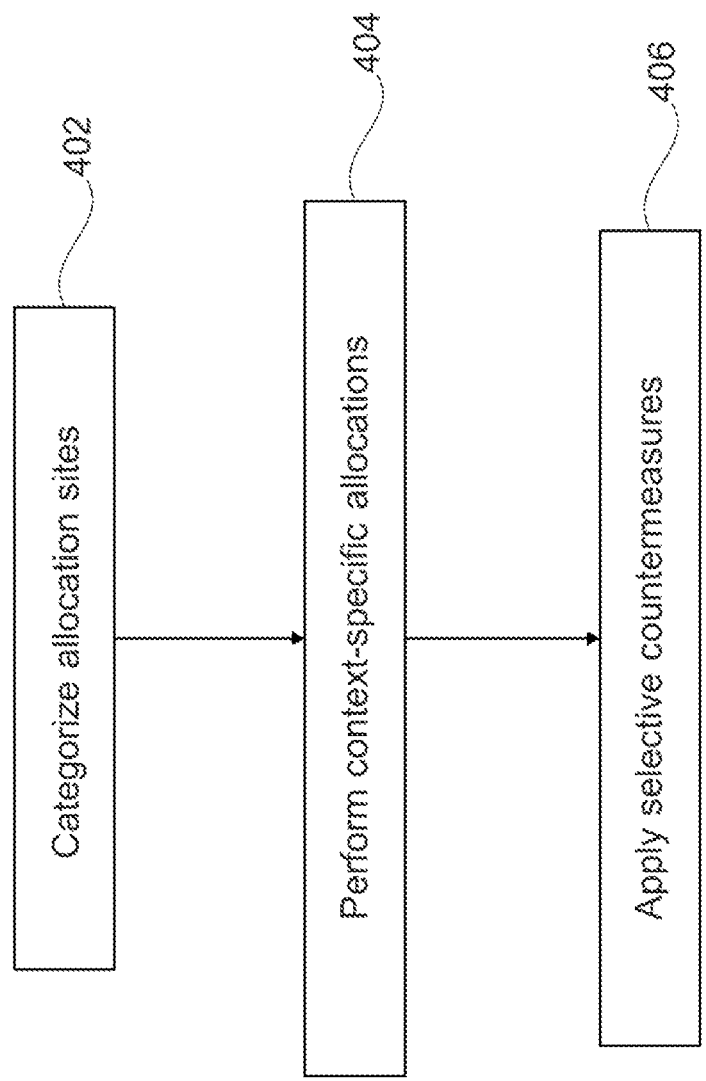

MEMORY CATEGORIZATION

BACKGROUND

The present invention relates to preventive computer software security, and more particularly, prevention of memory corruption vulnerability exploitation.

Memory corruption attacks against software written e.g. in C or C++ are still prevalent and remain a significant cause of security breaches. Defenses providing full memory safety remain expensive, and leaner defenses only addressing control-flow data are insufficient.

Most prominent published exploits (e.g., through competitions or various vulnerability reward programs) in the last few years rely on memory corruption vulnerabilities to achieve remote code execution, sandbox escape, privilege escalation, or leakage of sensitive data. The increasing difficulty of crafting such exploits is in part due to mitigations that were developed in the last two decades. This includes advanced defense mechanisms that were pioneered by the research community, such as Control Flow Integrity (CFI).

Many mitigation approaches focus on providing control-flow integrity, i.e. the protection of code and code pointers. CFI approaches often assume a very powerful attacker, capable of arbitrary memory reads and writes, albeit with a comparatively restrictive goal: modification of control flow. However, vulnerabilities such as Heartbleed demonstrate that even attackers with (restricted) out-of-bound read capability can already achieve their goals (such as leaking sensitive cryptographic material). In essence, control-flow data is in general not the only data that a program needs to protect to fulfill its security goals. At the same time, approaches that aim to provide full memory safety currently incur prohibitively high overhead.

BRIEF SUMMARY

It is an objective of the present invention to provide for a method, a computer program product, and a system for automatically separating data of different data types in a memory of a computer during execution of a software program. Embodiments of the invention are given in the dependent claims. Embodiments of the present invention can be freely combined with each other if they are not mutually exclusive.

Embodiments of the present invention disclose a method, computer program product, and system for automatically separating data of different data types in a memory of a computer during execution of a software program. The data types include a trusted data type and an untrusted data type, and the program comprises a set of allocation instructions. For a given allocation instruction of the set, the following is performed: linking the allocation instruction to at least one data source, generating context information specific to the given allocation instruction, evaluating the at least one data source to determine the data type, and associating the data type with the context information. In the memory, mutually separated memory regions are assigned for each of the data types for storing any data of the respective data type, and an additional memory region for storing any data which cannot be uniquely assigned to one of the data types. For a given allocation instruction of the set, memory for storing data from the at least one data source is allocated by evaluating the context information specific to the given allocation instruction, and, based on the evaluation of the context information, allocating the memory for storing data from the at least one data source in the memory region for storing data of the data type associated with the context information.

BRIEF DESCRIPTION OF THE DRAWINGS

In the following, embodiments of the invention are described in greater detail, by way of example only, making reference to the drawings.

FIG. 4 depicts a high-level flow diagram of a typical memory categorization process.

DETAILED DESCRIPTION

Figure 1:
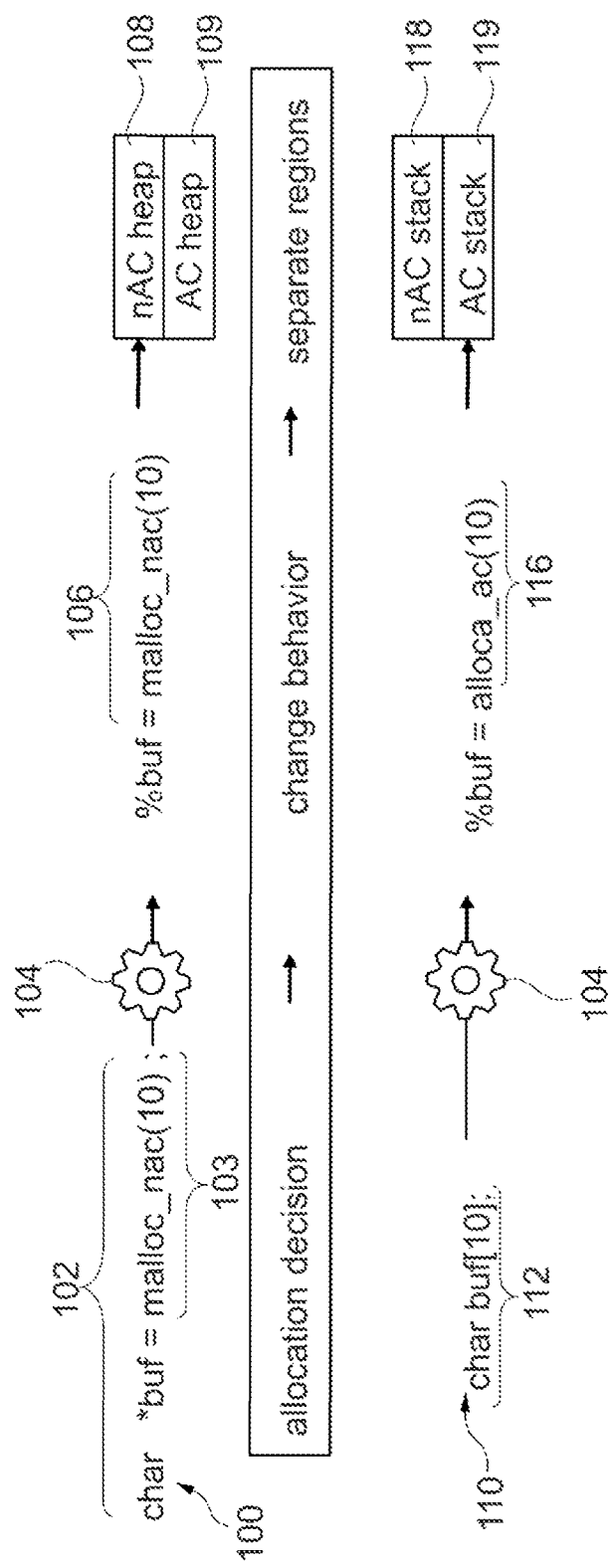
FIG. 1 depicts a schematic diagram of context-specific memory allocation.

Software vulnerability exploitations of recent years have shown that it is still possible for an attacker to access sensitive data, such as user credentials or decryption keys, for instance by reading beyond given memory boundaries or using unused pointers ("dangling pointers") to memory regions containing such data at a given execution point when the pointers should have been destroyed to protect the sensitive data. Therefore, it would be advantageous to be able to discern trusted from untrusted data and to store them in separate memory regions, and to prevent access to trusted memory regions by code executing from an untrusted memory region.

The present disclosure introduces an approach, called "memory categorization", for solving this problem, in which attacker-controlled data is separated to prevent the exploitation of memory corruption vulnerabilities such as use-after-free and user-after-return. This approach may be implemented by: i) providing separate stacks and heaps for different data categories, ii) categorizing allocations through static and dynamic analysis, iii) instrumenting allocations to take advantage of the categorization.

The present disclosure also proposes a memory categorization approach (in the following referred to as "MEMCAT") that i) is automated (no manual annotations of allocations are required to categorize memory), ii) allows for categorizing both stack and heap data, and iii) may have low overhead. MEMCAT may be built on top of established and novel techniques and tools, such as sparse value flow analysis, heap hardening and dynamic taint propagation, and combine them in a novel fashion.

As described in more detail below, and with reference to the Figures, the disclosed embodiments may advantageously analyze and label memory allocation sites and enforce the separation of attacker-controlled data from other data. Memory categorization may mitigate memory corruption vulnerabilities such as buffer overruns or dangling pointers (for example, use-after-free vulnerabilities). This approach may allow for the use of targeted hardening of the allocators supplying memory over which the attacker has full or partial control. Selective hardening may provide real additional security at a fraction of its cost, and may thus permit the use of otherwise impractical tools or techniques. An evaluation of real-world vulnerabilities in Dropbear and OpenSSL has demonstrated the prospective effectiveness of MEMCAT, while a performance evaluation on SPEC has shown that it may be expected to come at little cost.

Memory categorization is a new mitigation class that can be used to separate attacker-controlled data from other data, including internal program data. Memory categorization is based on the following observation: if all an attacker can read or modify is attacker-controlled data, its ability to compromise the system may be limited to the point of inefficacy. Memory categorization may provide a looser, yet relevant form of memory safety. For example, a use-after-free may only result in an access to data categorized as attacker-controlled. Attacker-controlled data excludes in particular sensitive data, such as control-flow data, pointers, and cryptographic material used by the program. Because attacker-controlled data is not of interest to the attacker, by definition, the approach may defuse such types of vulnerabilities.

In one implementation of the disclosure, a new mitigation class is proposed, memory categorization, which separates attacker-controlled data from other data. If enforced thoroughly, memory categorization limits an attacker to reading or modifying only its own data, drastically reducing its ability to compromise the system. MEMCAT is introduced, which is a low-overhead and automated approach to memory categorization. MEMCAT is based on static and dynamic analysis methods and applies memory categorization to both the program stack and heap.

It is assumed that an attacker may be capable of launching repeated attacks against a process with the goal of corrupting process memory. This includes attempts to manipulate, and disclose, memory contents in an illegitimate way. For a particular memory attack model, this may include the ability to make a pointer go out of bounds, make a pointer become dangling, and, as a consequence, use that pointer to write or read memory.

MEMCAT is designed to thwart memory corruption of a process. It operates at the same privilege level as the victim program, assuming a benign operating system.

The goal of memory categorization is to separate memory regions based on whether they contain attacker-controlled (AC) data or not-attacker-controlled (nAC) data. To achieve this goal, it is necessary to i) decide on a case-by-case basis from which region memory should be allocated, ii) implement this decision in the program and iii) provide mechanisms for separated memory allocation. To address the different semantics of allocation mechanisms as well as to combine the merits of both static and dynamic analysis, MEMCAT may operate at both compile time and runtime.

Referring to FIG. 1, a high-level overview of two exemplary memory categorization procedures, 100, 110 involving replacement of allocators is shown. MEMCAT uses distinct category allocators 106, 116 for heap memory categorization 100 and stack memory categorization 110. The memory categorization process 104 decides whether an allocation instruction 102, 112 provides memory that is used for attacker-controlled data. If the categorization process 104 finds that the allocation request 102, 112 may be used for writing untrusted or AC data to the memory, it changes the allocation behavior such that memory is allocated from a separate memory region 108, 109, 118, 119. In the depicted example, the memory is subdivided into a heap memory 108 for storing trusted data, a heap memory 109 for storing untrusted data, a stack memory 118 for storing trusted data, a stack memory 119 for storing untrusted data. In the heap-type memory categorization 100, the memory categorization process 104 detects that the program will use the heap memory to be allocated by heap allocation instruction 102 only for storing trusted data. The standard heap allocator 103 is therefore replaced by the heap-type category allocator 106 for trusted memory to serve the allocation from the heap memory 108 for storing trusted data (indicated in the Figure by an arrow). In the stack-type memory categorization 110, however, the memory categorization process 104 detects that the program will use the stack memory to be allocated by stack allocation instruction 112 for storing untrusted data. The standard stack allocator (not shown in the Figure as it is called implicitly) is therefore replaced by the stack-type category allocator 116 for untrusted memory to serve the allocation from the stack memory 119 for storing untrusted data (indicated in the Figure by an arrow).

Separate Allocation Mechanisms

According to an embodiment, the category allocators include a stack-type category allocator and a heap-type category allocator. MEMCAT may intercept both the stack and the heap mechanism and extend them to properly handle AC data to ensure that it is stored in a region that is separate from that used for nAC data. This way, an attacker may be limited to corrupting or leaking attacker-controlled data only.

According to an embodiment, each of the allocation instructions comprises a call to one of a set of standard allocators, the method further comprises replacing the set of standard allocators with a set of category allocators, each of the memory regions is assigned to at least one of the category allocators, and the allocating includes calling one of the category allocators for storing data from the at least one linked data source in the assigned memory region. Replacing standard allocators with custom category allocators may increase speed, efficiency and customizability of the method.

Allocations on the stack are typically used only for a single purpose and for simple data structures. As a consequence, MEMCAT only requires two separate stack allocators, one for AC data and one for nAC. Conversely, allocations on the heap are often used in more complex ways. For example, custom memory managers can be implemented on top of the heap, and so the same memory area can be used for disparate purposes. As another example, the heap often hosts more complex data structures, such as linked lists, where the elements of the list store both list metadata as well as payload in a single allocation. These use cases show that a single memory location may well store both AC and nAC data. As a consequence, three heap allocators are introduced: one for AC data, one for nAC data, and one for allocations that mix nAC and AC data (referred to as mixed).

According to an embodiment, the additional memory region further includes a memory region for storing any data which cannot be stored in separated memory regions. The mixed category may remain prone to attacks. For example, if a vulnerability related to AC data categorized as mixed exists, and if a sensitive piece of data was also categorized as mixed, then the attacker may succeed in an attack. Nevertheless, this category may remain beneficial for multiple reasons: i) there may be no data of interest to the attacker in the mixed memory, rendering the vulnerability unexploitable in practice, for example, in the case of an information leakage vulnerability such as Heartbleed, private keys will not be in the mixed category; ii) it is the mixed category that makes vulnerabilities categorized as nAC not exploitable, thereby reducing the number of exploitable vulnerabilities; iii) in practice, the set of allocations in mixed memory will be much lower than in nAC memory, which means that the mixed memory can be selectively hardened against attacks at low overall performance cost.

Allocation Sites:

Memory allocators are invoked at locations in the program referred to as allocation sites or allocation instructions. Allocations may be identified, based on their allocation site, to attribute them to a specific use. The identifier of the allocation site of local variables may be the function entry, whereas the program counter may be used at the time of the call to alloca to identify those allocations.

For heap allocations this approach is not sufficient. For example, a program may invoke malloc from a single location to supply memory for all its components. This is what may happen with allocation wrappers such as xmalloc that decorate the functionality of the system's default heap allocator. In the case of using the program counter as an identifier, it can be concluded that there is only a single allocation site. This may be why for heap allocation sites, the set of return addresses in the call stack that led to the allocation, should be a part of the identifier.

Allocation Decision

To decide which memory allocator (AC, nAC, or mixed) should be used at a specific allocation site, it may be necessary to know how the allocated memory is used later in the program. Allocators return a pointer that points to the allocated memory region. Pointers are used to access the memory region, and serve as a handle to it. In the course of program execution, these pointers may be modified and stored to memory in turn. The analysis process may work as follows: (i) identify data sources that provide AC input, (ii) follow the pointers used to store data from these sources to find (iii) all allocation sites that have allocated memory for those pointers. The following code snippet illustrates this process:

```
1    char *cmalloc (int sz) {
2      if (sz == 0) return NULL;
3      return (char *) malloc(sz);
4    }
5    int main (int argc, char **argv) {
6      int fd = open(argv[1], O_RDONLY);
7      char *buf = cmalloc(10) ;
8      read (fd, buf, 10);
9      ...
10   }
```

In the beginning, MEMCAT identifies the read in line 8 as providing attacker controlled input to the pointer buf. It then tracks back from line 8 to find the allocation site for buf, following the call to cmalloc, which leads to malloc in line 3 with the context being lines 7, 3.

AC input is typically provided from data sources such as the network, hardware peripherals, or storage systems (for example, files). To obtain input from these sources, a program sends a service request to the operating system. The read( ) system call serves as a prime example. It reads potentially AC input from a file descriptor and places it in a memory region specified by a pointer argument.

According to an embodiment, the method further includes compiling a source code of the program, and at least part of the evaluation is based on the source code as a compile-time evaluation. This may beneficially enable generation of context data prior to runtime. This pre-generated context data may in turn be used by runtime embodiments of the invention to increase efficiency of categorization and separation of the memory regions.

At compile time all function calls are walked through to identify those that follow a similar semantic, i.e., writing AC input to a memory region, to flag the corresponding pointers as pointing to AC memory regions. In addition, calls to these functions are intercepted at runtime to enhance the analysis if the compile time one was not conclusive for that case.

According to an embodiment, the source code includes calls to functions of the program, and the compile-time evaluation further includes:

for each call, determining the data types of any data to be provided to the memory;

for each function determined to include a pointer capable of providing untrusted data to the memory, performing a points-to analysis for each pointer of the function pointing to the memory to determine all allocation instructions using the pointer;

performing a static value-flow analysis on an output of the points-to analysis to determine a value flow graph of the program; and for each node of the value flow graph, generating the context information by performing a context-sensitive backward traversal.

As will be detailed below, this may advantageously provide an efficient way of generating the context data at compile time. Given a pointer that is associated with AC input, it is necessary to identify the site(s) where it was allocated. In the example above, the read(fd, buf, 10), is matching the heap allocation site malloc(sz), but it in a different scenario it could also be a char buf[32] on the stack. To accomplish this task, a points-to analysis may first be performed at compile time. The scope of the analysis is the whole program at an inter-procedural level. In a exemplary embodiment, Andersen's pointer analysis is chosen because a flow-sensitive method would be unlikely to scale. The result of this analysis is a set of allocation sites for every pointer used by a function that provides AC input. Since the analysis is flow- and context-insensitive, context information on the allocation sites is missing. It is thus necessary to determine the invocation context(s) under which these allocation sites provide memory regions used for AC input.

For this task, static value-flow analysis may be used. Taking the field-sensitive points-to information generated from Andersen's pointer analysis as an input, SVF constructs an inter-procedural memory single static assignment (MSSA) form of a program. MSSA extends the concept of SSA for top-level variables to address-taken variables. When a pointer is dereferenced, i.e., an address-taken variable is loaded, this corresponds to a use of the address-taken variables the pointer refers to. When a pointer is assigned, i.e., an address-taken variable is stored, this corresponds to both a use and a definition of the address-taken variables the pointer refers to. To capture inter-procedural dependencies, call sites of functions that operate on address-taken variables of inter-procedural scope also correspond to both a use and a def. The def-use chains of both top-level and address-taken variables are then used to create an inter-procedural, sparse value flow graph (VFG), that connects the definition of each variable with its uses. For example, in the VFG, nodes are either a definition of a variable at a non-call statement, a variable defined as a return value at a call site, or a parameter defined at the entry of a procedure. The edges of the VFG represent the def-use value-flow dependencies, direct for top-level pointers, indirect for address-taken pointers.

After generating the VFG, the nodes corresponding to pointers associated with AC input are looked up. For each of them, a context-sensitive backward traversal may then be performed on the VFG, adding precision on top of Andersen's points-to analysis for the pointers of interest. Every time a corresponding allocation site is reached, the context under which the allocation site should actually provide a memory region for AC input is now available.

It is understood that the above selection of Andersen's points-to analysis is merely representative. Other techniques now known later developed may naturally occur to and be used by a person of ordinary skill in the art to perform the static pointer analysis as disclosed herein. The same holds for the selection of static value-flow analysis for evaluating the output generated by the points-to analysis. A person of ordinary skill in the art may freely select from numerous graph theoretical, network theoretical or other semantic methods to generate the context information from results of a points-to analysis.

According to an embodiment, the allocation instructions include stack-type allocation instructions, and the method further includes replacing each of at least part of the stack allocation instructions by a call to the stack-type category allocator matching the data type provided by the context information for the stack allocation instruction.

According to an embodiment, the allocation instructions include heap-type allocation instructions for allocating a heap, and the method further includes, for each of at least part of the heap-type allocation instructions, determining the context information by collecting a set of return addresses associated with the heap-type allocation instruction from a call stack of the heap.

As described below, these embodiments may provide an efficient way of generating the context information at runtime. To complement static pointer analysis, the functions that supply AC input are intercepted also at runtime. Then, it is detected which allocator—stack or heap—has been used for a given pointer by seeing where it fits with respect to the process memory layout. Obtaining context information on heap allocations may be accomplished by intercepting heap allocators, unwinding their call stack and associating it with the value of the pointer. While this information is only available after the allocation has already happened, it is required it to fill in potential information gaps of the static pointer analysis. Static pointer analysis is limited to the code available at compile time, while at runtime programs dynamically link additional software components—shared libraries. Neither allocations nor uses of pointers within dynamically linked code are known to static analysis.

In addition, it is possible to employ a conservative form of dynamic taint propagation. According to an embodiment, the program includes a copy instruction for copying source data from a source memory region of the memory regions for storing untrusted data into a destination memory region of the memory, and the method includes, during execution of the copy instruction, based on the data type of the source data, changing the allocator for the destination memory region. By tracking pointer use in copy operations, additional memory regions may be identified that hold AC data: If the source pointer is associated with a memory region tagged as AC or mixed, the target memory region may be categorized correspondingly.

Changing Allocation Behavior

According to an embodiment, the allocation instructions include stack-type allocation instructions, and the method further includes replacing each of at least part of the stack allocation instructions by a call to the stack-type category allocator matching the data type provided by the context information for the stack allocation instruction. For the stack, compile-time analysis may therefore advantageously invoke the appropriate allocator directly based on whether the allocation is used for AC input or not.

According to an embodiment, the method further includes:
  intercepting a write access to the additional memory region;
  evaluating the data source for the write access to determine the data type;
  based on the evaluation of the data source for the write access, assigning the allocation instruction corresponding to the write access to one of the memory regions; and
  redirecting the write access to the memory region assigned to the allocation instruction.

These features may beneficially allow for applying heap memory categorization also to data for which no context information was generated yet. For the heap, compile-time analysis unwinds the call stack to determine the context in which an allocation site will provide a memory region used for AC input. At runtime it adaptively changes the allocator's semantics based on the context information. When it encounters an allocation site it has no information on, it serves the memory request from a separate data structure called the limbo heap.

Write accesses to the limbo heap may be intercepted by the runtime and analyzed based on whether they are associated with a data source supplying attacker-controlled input or not. Once a memory region from the limbo heap is categorized as storing AC, nAC or mixed data, future allocations from the same site may be served from the corresponding nAC, AC or mixed heap. Furthermore, MEMCAT may offer several heuristics for early categorization.

According to an embodiment, the method further includes applying a vulnerability countermeasure to any of the memory regions comprising trusted data. Hence, the categorization may additionally enable an efficient application of selective hardening, which has been shown to provide great performance improvements over full hardening even for costly mechanisms. In the context of MEMCAT, this means that the implementation of the nAC, AC, mixed heap or stacks can differ.

According to an embodiment, the vulnerability countermeasure includes heap hardening. In particular, previously costly hardened-heap mechanisms can be applied to the AC (or mixed) heap, and only incur modest performance overhead because only a fraction of all allocations will be redirected to these heaps. Assuming that the categorization does not misclassify an attacker controlled buffer into the nAC heap, this means that all the security benefits of the hardened heap can be provided at a fraction of its performance costs.

The implementation of MEMCAT may consist of a compile- and a runtime component. While providing the optimal protection together, both components can operate completely independently of one another. This allows MEMCAT to provide protection even for programs where no source code is available.

Compile-Time Implementation

A task of the MEMCAT compile time component is to label all allocation sites based on what kind of memory should be provided. The component may be implemented as a compiler pass, for example, without limitation, on the intermediate representation of the clang/llvm toolchain version 3.9. To provide it with the most comprehensive view of the program, the pass may work at the link-time-optimization (LTO) stage, where all translation units of a program have already been linked together.

Figure 2:
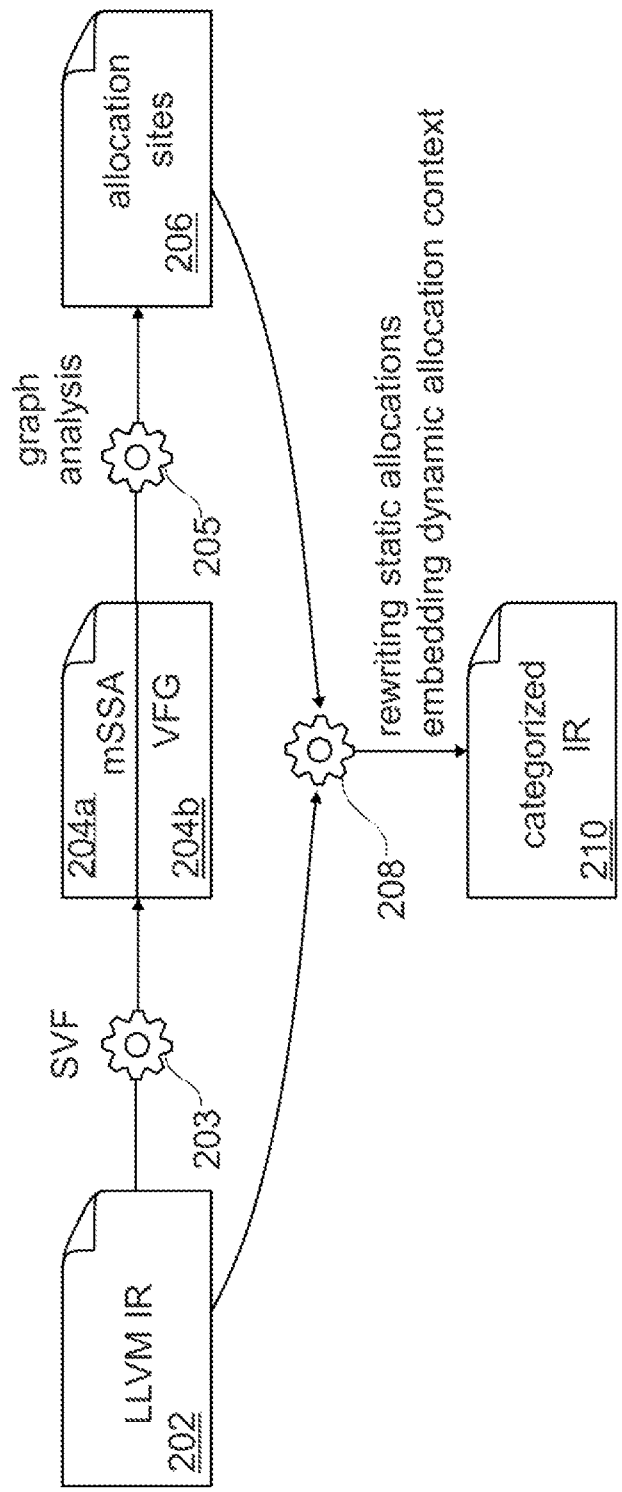
FIG. 2 depicts a schematic diagram of compile-time evaluation.

FIG. 2 shows an overview of the compile-time processing performed by MEMCAT. LTO-LLVM intermediate representation (IR) 202 of the program is processed by static value-flow analysis 203 to build the memory-static single assignment (SSA) form 204a and the value-flow graph

204b. The graph 204b is traversed backwards 205 from AC pointer use to the corresponding allocation sites 206. As a result, static allocations are rewritten on the spot, and for dynamic allocations the context information is embedded in the categorized IR output 210 of compiler pass 208.

The pass may commence with Andersen's pointer analysis using a Wave solver. It may then use sparse value flow analysis (SVF) to construct the mSSA form. The def-use chains for top-level pointers can be directly obtained from the LLVM IR, since it already is in SSA form, with one statement defining one variable. The semantics for address-taken pointers from the design section apply naturally to the LLVM IR's load and store instructions. To go inter-procedural, entry and exit of functions are annotated with a def and use for non-local variables. These can then be linked to the arguments and return values at the call sites of a function. In the VFG, nodes are either statements (load, store, getelementptr), or parameters and return values. They are connected with intra-procedural or call/ret edges that can be either direct or indirect.

Then the pass iterates over a list of functions that provide AC input. When MEMCAT finds such a function, it starts a backward traversal on the VFG starting from the pointer parameter supplied to the function. The backward traversal is done in a worklist-style manner, keeping track of the context. Context sensitivity may be implemented based on associating every call site with a unique ID, which also serves to prevent recursion on the VFG.

Whenever the backward traversal hits a heap allocation, the context of the allocation may be processed. For example, to be able to refer to the return sites given by the context at runtime, the corresponding basic blocks are split at the return site to obtain their block address. To access this information at runtime, an externally visible, global variable is added to the program executable that points to a two-dimensional array of all AC allocation site contexts.

Attacker-controlled stack allocations (alloca) may be replaced at compile time to point to offsets in the AC stack. The AC stack is implemented as an mmaped memory region that can be accessed via two variables in thread-local storage that point to the base and the top of the stack. The implementation leverages LLVM's safe stack mechanism and does not require further runtime support.

Runtime Implementation

The objectives of the heap runtime component are threefold: i) track all dynamic memory allocations; ii) categorize each allocation site based on the type of use the program makes of the allocated buffers; and iii) create secure boundaries between allocations that have been categorized differently.

Figure 3:
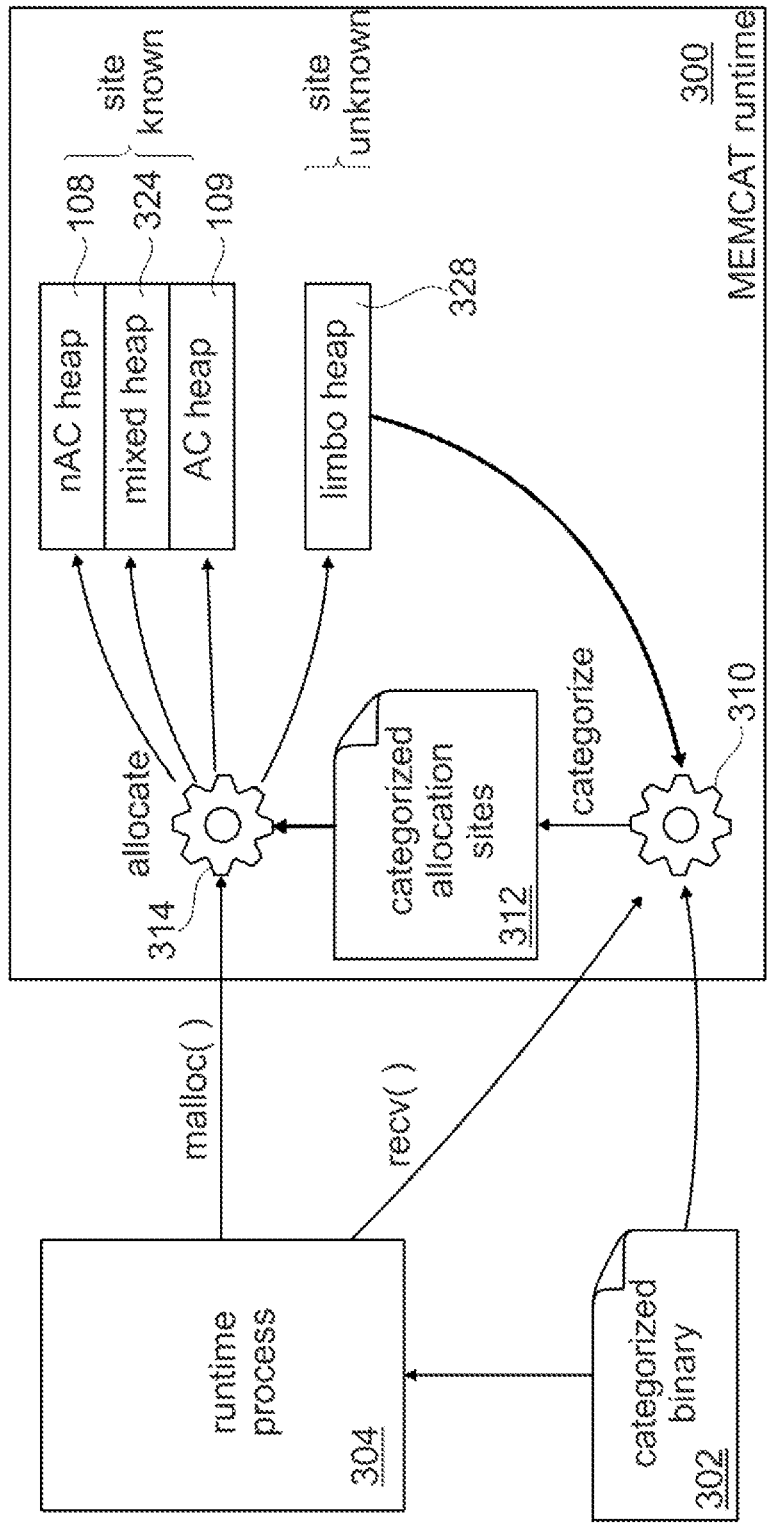
FIG. 3 depicts a schematic diagram of runtime memory categorization.

FIG. 3 shows an overview of runtime heap allocation activities performed by a representative implementation of MEMCAT 300. Categorized allocation sites are read from the categorized binary 302 of a program by the MEMCAT categorization runtime component 310 on startup of runtime process 304 of the program. If an allocation from a known site is encountered by the categorization runtime component 310, memory from the corresponding heap 108, 109, 324 is served by the MEMCAT allocation component 314 based on the current context information 312 comprising both the context information read in on startup, as well as context information newly generated by the categorization runtime component 310. Among the heap memory for data of a known data type is heap memory 324 for mixed AC and nAC data which cannot be stored in separate memory regions. If the allocation site is not known, memory from the limbo heap 328 is served by the allocation component 314. Whenever attacker-controlled data is written to memory, MEMCAT checks which limbo allocation the memory belongs to and categorizes the corresponding allocation site.

In the following, the runtime activities are described in greater detail.

1) Tracking: Tracking memory allocations can be performed by intercepting library calls such as malloc, calloc and memalign. glibc's hooks help applications override these functions by exposing the variable malloc initialize hook, which points to a function that is called once when the malloc implementation is initialized. This function can be overridden and used to overwrite four more function pointers (referred to as the malloc hooks) that are called by glibc before each heap-related function call.

2) Assigning identifiers to call sites: Categorization of allocation sites means assigning a label to each unique call to any of the functions that allocate dynamic memory. It is not sufficient to search for all instances of a call instruction to one of these functions: indeed, there might be distinct code paths that reach any one of them, and each should be counted as a distinct site. Identifiers for each of the call sites (64-bit integers in a typical implementation) may be obtained as follows: whenever one of the malloc hooks is called to allocate memory, the stack is unwound and return addresses are extracted for each of the frames. This array of return addresses is hashed onto a 64-bit integer as follows: initially the hash is zero. A loop dereferences each address in the array to obtain a quadword which is circularly shifted by 7 positions, xored with the 12 least significant bits of the dereferenced address and finally xored with the hash. The hash is then circularly shifted by 13 positions to be ready for the next round. This approach ensures repeatable identifiers across executions despite the presence of randomized address spaces (for example, ASLR): virtual addresses may be randomized but: i) the bytes they dereference remain constant by definition and ii) randomization stops at a page granularity and so the 12 LSBs are bound to remain constant.

A comparison with a cryptographic hash function (SHA256) was applied over the entire array to verify how many collisions the hash function introduces. The results show that the function displays adequate properties of collision resistance, with the highest collision rate registered at 2%. Collision rate here is defined as the ratio between the total number of collisions and the total number of unique hash values outputted by the reference hash function (SHA256).

3) Categorization: The categorization process assigns a label to each call site identifier based on whether memory allocated by that call site is used to store attacker controlled data, non-attacker-controlled data, or both, throughout its lifetime before it is freed. Performing this determination is not trivial: at allocation time this information is not available to a purely runtime component. Therefore, it is necessary to hold off the categorization until the allocated memory is used, since the categorization depends on the source of the data being stored. A complete list of taint sources is outside of the scope of this disclosure. In a preferred implementation, all calls to fgetc, fgets, fread, fscanf, pread, read, recv, recvfrom and recvmsg are considered as sources of taint whenever they successfully write data into one of the buffers to be categorized. In parallel, a set of benign functions (memset, bzero) that do not affect the categorization process was identified. This aims to capture the coding practice of zeroing out allocated buffers. This is only the default taint source configuration, applications can easily change them to capture appropriate settings for their use case.

It is possible that a program is free to write to any allocated memory region any number of times at any offset, storing data coming from any source. Therefore, to categorize a buffer at runtime, it is necessary to keep tracking writes to it over the course of the execution of the program. To do this, a limbo heap may be built that serves memory to all not-yet-categorized allocation sites. The limbo heap may use mmap to allocate one or more pages to satisfy the program's request for dynamic memory. The memory-mapped pages may be mprotect'd to ensure that every attempt to write to them will generate a page fault. A custom handler for SIGSEGV may be implemented that behaves as follows: if the fault is not caused by any of the pages in the limbo heap, the program is terminated. Otherwise, write protection may be removed from the page and the offending instruction (i.e. that which generated the page fault) is emulated. The emulation may be performed by first decoding the instruction with udis862 and by performing the required operation on the saved processor state (represented by the pointer to a ucontext_t struct provided as third argument by the operating system if the signal handler is registered with the SA_SIGINFO flag). The IP register saved in the context is then incremented to ensure that the offending instruction is skipped when execution resumes, and finally the protection on the page is re-introduced. This last step is required to keep tracking future writes to the page.

With this approach it is evident that a perfect categorization may be unreachable, given that usage of memory buffers might be data-dependent, and so it may always be possible that the code makes a different use of the buffer in a future run. As a consequence, heuristics may be developed to determine when the categorization can be declared complete. Until the categorization is complete, new allocations from the same allocation site may have to be handled by the limbo heap, with the associated overhead. However, an early categorization might mistakenly assign a site to the wrong category. The following exemplary heuristics may be implemented and deployed: i) never stop the categorization process; ii) stop the categorization process after a configurable amount of writes into the buffer; iii) stop as soon as all the allocated bytes have been written to at least once. After the categorization phase is declared complete for a given call site, the call site may be labelled. This may be achieved by adding an entry in an internal data structure, the call site to label map, that associates the 64 bit call site identifier to the integer representing one of the three labels. When one of the malloc hooks is asked to allocate memory for the program, it may determine the current call site identifier (as described above), search if a match is present in the map for that identifier and if so, allocate memory according to the label.

4) Handling allocations: The heap runtime component includes a custom memory allocator that is based on ptmalloc2 from glibc. ptmalloc2 is a memory allocator where memory is served out of a pool of independent arenas. In an embodiment, an arena is essentially a linked list of large, contiguous memory buffers obtained using brk or mmap. An arena may be divided into chunks that are returned to the application. ptmalloc2 uses a pool of arenas in order to reduce thread contention. Instead of a single pool of arenas, the custom allocator is designed and coded to handle independent pools, one for each of the labels. The label of an allocation site serves as an additional argument transparently supplied by the heap runtime component to the custom allocator, indicating the pool that should supply the chunk to be given to the application. Call sites similarly labelled in the course of the categorization might be supplied with chunks from the same pool of arenas (potentially even the same arena, or the very same address). Conversely, call sites labelled differently are guaranteed to never receive addresses from the pool. Note that this guarantee needs to span across the entire lifetime of the program. For example, if the memory allocator releases the arena of a given pool (for example, by calling munmap), it should guarantee that the same arena will not be reused for a different pool later.

In addition, to demonstrating the feasibility and low performance impact of selective hardening, a simple hardened allocator was also implemented for AC allocations. In an embodiment, it is essentially an mmap-based allocator3. Each memory allocation (including small allocations) may be performed using the mmap call, and is surrounded by guard pages. This may mitigate many heap-related attacks by itself. For example, uninitialized-data leaks are prevented because newly allocated pages are zeroed by the OS, heap-based buffer overflows (reads and writes) are prevented thanks to guard pages, and double-frees have no impact. Such an allocator might incur a prohibitive performance cost if all allocations were performed with this allocator (OpenBSD uses a similar allocator for their heap, only for large zero-allocations for performance reasons). However, MEMCAT may only categorize a fraction of heap allocations as attacker controlled, and therefore may reduce performance overhead.

FIG. 4 shows a high-level overview of a representative process sequence involving both memory categorization and selective vulnerability countermeasures. Allocation sites are categorized 402 by generating the context information at compile time. This step may be enhanced by runtime categorization as described above. At runtime, context-specific allocations are performed 404 for the available context information. The categorized, mutually separated memory regions are then subject 406 to countermeasures as described above (for example, hardening). This may yield a performance increase as the countermeasures are selective to those memory regions comprising trusted data.

5) Taint propagation: The taint propagation component captures the case in which one of the identified AC input (taint sources) generates data into an intermediate buffer which is only later copied into the heap. It allows categorizing later copies into the heap correctly as AC (or mixed).

The component may hook every function that supplies AC input. If the AC-controlled data is not copied into a buffer in the limbo heap, the component adds a taint record into a global set. A taint record is a tuple <addr, len, start ip, end ip>, where addr is the target address, len is the amount of data generated by this call to the taint source and start ip, end ip are the addresses of the first and last instruction of the caller of the taint source function, as determined by libunwind4. Later, when an instruction is emulated as a result of a trap caused by a write into the limbo heap, it may be determined whether two conditions simultaneously hold: i) the source argument of the offending instruction draws input from a memory area that overlaps any taint record's addr, len range; and ii) the backtrace of the offending instruction shows that one of the return addresses is contained in the start ip, end ip range of the taint record identified in the previous condition. The second check may determine whether the caller of the function supplying AC input is one of the callers of the function that is attempting to write into the limbo heap. This second check may filter out false positives caused by one function writing tainted data into a buffer, and a different function writing data into the limbo heap from the same address range used by the first function.

Despite its apparent simplicity, this component may be capable of expanding the reach of the categorization process.

6) Learning: An access to a buffer in the limbo heap may incur a high overhead because of the trap and subsequent emulation. This negative effect on performance may be dampened by the heuristics for early categorization. However, they are still not sufficient to achieve acceptable performance. Because a limbo heap allocation might be long-lived, it may be the only one for that allocation site or an allocation site can be visited several times before it is categorized.

To mitigate this problem, a learning component may be introduced to MEMCAT. According to an embodiment, the method further includes:

- writing the context information generated for the given allocation instruction to a computer-readable non-volatile storage medium;
- reading context information previously generated for a subset of the set of allocation instructions from the storage medium;
- for a further allocation instruction of the set of allocation instructions, performing the memory allocation with skipping of the generation of context information specific to the further allocation instruction in case the further allocation instruction is included in the subset of allocation instructions, the assignment being based on the read context information, otherwise performing the generation of the context information specific to the further allocation instruction.

The learning component may persist to disk the data structure that maps allocation sites to labels across multiple runs. When a program is restarted, the map of complete categorizations may be loaded. Any allocation site that was learned in a previous run may be directly handled by the appropriate allocator. This may be possible because the hash function may guarantee that call site identifiers remain constant across executions.

According to an embodiment, the data types include at least two untrusted data types. Not all attacker controlled data may be unimportant for the attacker, for example, in a program with multiple distrusting users. If the program receives data from multiple distrusting external sources, the categorization process may conclude that they are all attacker controlled, whereas the attacker might only control a subset of them and might find it advantageous to learn or modify others. An extension to MEMCAT might address this by providing more than one AC label, one for each distinct external untrusted data source, and optionally by creating as many distinct allocators. Therefore, categorizing into at least two untrusted data types may not only protect nAC data from any of the attackers, but may also isolate data of one user from that of another.

An implementation of MEMCAT on x86-64 Linux demonstrated its ability to prevent past vulnerabilities on real world software such as OpenSSL. A further evaluation of its performance overhead on the SPECint 2006 benchmark suite resulted in a geometric mean of less than 10% for both stack and heap allocations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A method for automatically separating data of different data types in a memory of a computer during execution of a software program, the data types comprising a trusted data type and an untrusted data type, the program comprising a set of allocation instructions, the method comprising:
for each allocation instruction of the set, performing the following:
linking the allocation instruction to at least one data source;
generating context information specific to the given allocation instruction;
evaluating the at least one data source to determine the data type; and
associating the data type with the context information;
assigning, in the memory, mutually separated memory regions, comprising:
for each of the data types, a memory region for storing any data of the respective data type; and
an additional memory region for storing any data which cannot be uniquely assigned to one of the data types;
for each allocation instruction of the set, allocating memory for storing data from the at least one data source, comprising:
evaluating the context information specific to the given allocation instruction; and
based on the evaluation of the context information, allocating the memory for storing data from the at least one data source in the memory region for storing data of the data type associated with the context information.

2. The method of claim 1, wherein the additional memory region further comprises a memory region for storing any data which cannot be stored in separated memory regions.

3. The method of claim 1, wherein each of the allocation instructions comprises a call to one of a set of standard allocators, and the method further comprises replacing the set of standard allocators with a set of category allocators, each of the memory regions being assigned to at least one of the category allocators, the allocating comprising calling one of the category allocators for storing data from the at least one data source in the assigned memory region.

4. The method of claim 3, wherein the category allocators comprise a stack-type category allocator and a heap-type category allocator.

5. The method of claim 1, further comprising:
intercepting a write access to the additional memory region;
evaluating the data source for the write access to determine the data type;
based on the evaluation of the data source for the write access, assigning the allocation instruction corresponding to the write access to one of the memory regions; and
redirecting the write access to the memory region assigned to the allocation instruction.

6. The method of claim 1, wherein the program comprises a copy instruction for copying source data from a source memory region of the memory regions for storing untrusted data into a destination memory region of the memory, and wherein the method further comprises, during execution of the copy instruction, based on the data type of the source data, changing the allocator for the destination memory region.

7. The method of claim 1, further comprising:
writing the context information generated for each allocation instruction to a computer-readable non-volatile storage medium;
reading context information previously generated for a subset of the set of allocation instructions from the storage medium;
for a further allocation instruction of the set of allocation instructions, performing the memory allocation with skipping of the generation of context information specific to the further allocation instruction in case the further allocation instruction is comprised in the subset of allocation instructions, the assignment being based on the read context information, otherwise performing the generation of the context information specific to the further allocation instruction.

8. The method of claim 1, further comprising compiling a source code of the program, at least part of the evaluation being based on the source code as a compile-time evaluation.

9. The method of claim 8, wherein the source code comprises calls to functions of the program, the compile-time evaluation further comprising:

for each call, determining the data types of any data to be provided to the memory;

for each function determined to comprise a pointer capable of providing untrusted data to the memory, performing a points-to analysis for each pointer of the function pointing to the memory to determine all allocation instructions using the pointer;

performing a static value-flow analysis on an output of the points-to analysis to determine a value flow graph of the program; and for each node of the value flow graph, generating the context information by performing a context-sensitive backward traversal.

10. The method of claim 8, wherein the allocation instructions comprise stack-type allocation instructions, the method further comprising replacing each of at least part of the stack allocation instructions by a call to the stack-type category allocator matching the data type provided by the context information for the stack allocation instruction.

11. The method of claim 8, wherein the allocation instructions comprise heap-type allocation instructions for allocating a heap, the method further comprising, for each of at least part of the heap-type allocation instructions, determining the context information by collecting a set of return addresses associated with the heap-type allocation instruction from a call stack of the heap.

12. The method of claim 1, wherein the data types comprise at least two untrusted data types.

13. The method of claim 1, further comprising applying a vulnerability countermeasure to any of the memory regions comprising trusted data.

14. The method of claim 13, wherein the vulnerability countermeasure comprises heap hardening.

* * * * *